(12) United States Patent
Namiranian

(10) Patent No.: US 10,686,912 B2
(45) Date of Patent: Jun. 16, 2020

(54) OVER-THE-AIR COMPANION USER DEVICE HANDLING

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/352,446

(22) Filed: Mar. 13, 2019

(65) Prior Publication Data

US 2020/0007655 A1 Jan. 2, 2020

Related U.S. Application Data

(60) Provisional application No. 62/692,452, filed on Jun. 29, 2018.

(51) Int. Cl.
| | |
|---|---|
| *H04M 3/00* | (2006.01) |
| *H04L 29/08* | (2006.01) |
| *H04W 8/24* | (2009.01) |
| *G06F 8/658* | (2018.01) |
| *H04W 76/14* | (2018.01) |
| *H04W 76/18* | (2018.01) |

(52) U.S. Cl.
CPC .............. *H04L 67/34* (2013.01); *G06F 8/658* (2018.02); *H04W 8/245* (2013.01); *H04W 76/14* (2018.02); *H04W 76/18* (2018.02)

(58) Field of Classification Search
CPC .... H04M 1/72525; H04L 67/34; H04W 76/14
See application file for complete search history.

(56) References Cited

U.S. PATENT DOCUMENTS

2018/0288560 A1* 10/2018 Naik ..................... G04G 9/06
2019/0069248 A1*  2/2019 Singh ............... H04W 52/0296

* cited by examiner

*Primary Examiner* — Justin Y Lee
(74) *Attorney, Agent, or Firm* — Han Santos, PLLC

(57) ABSTRACT

An over-the-air (OTA) platform of a wireless carrier network may be used to update a companion user device that is associated with a primary user device. The OTA platform receives a request from an entity to provide an OTA update to a companion user device that is registered with a wireless carrier network. The OTA platform identifies a primary user device associated with the companion user device based on subscriber account information for the companion user device. The OTA platform then sends a termination command to the primary user device to direct the primary user device to terminate an active short-range wireless communication link between the primary user device and the companion user device. This termination triggers the companion user device to establish a cellular communication link with the wireless carrier network. Subsequently, the OTA platform sends an OTA update to the companion user device via the cellular communication link.

13 Claims, 8 Drawing Sheets

OVER-THE-AIR COMPANION USER DEVICE HANDLING

CROSS-REFERENCE TO RELATED PATENT APPLICATION

This application claims priority to U.S. Provisional Patent Application No. 62/692,452, filed on Jun. 29, 2018, entitled "Over-The-Air Handling of Companion Devices," which is hereby incorporated by reference in its entirety.

BACKGROUND

Companion user devices, such as smartwatches, are becoming more mainstream with mobile device users. These companion user devices are generally wirelessly attached with primary user devices, e.g., smartphones, for long periods of time so that the companion user devices are able to use the cellular data services subscribed to by the primary user devices. The attachment of a companion user device to a primary user device may enable the companion user device to reduce battery consumption, as its cellular modem can be powered off. Further, by having the companion user device use the cellular data service of the primary user device, a subscriber may reduce or eliminate the apparent cellular data usage of the companion user device by having such usage counted as being accrued by the primary user device. Such reduction or elimination may enable the subscriber to minimize the cost of a cellular data subscription plan used by the companion user device.

However, companion user devices with powered-off cellular modems are generally unable to receive over-the-air (OTA) updates from wireless carrier networks. For example, an OTA update for a companion user device may be a Public Land Mobile Network (PLMN) list update to an Embedded Subscriber Identity Module (eSIM) profile that is stored in an Embedded Universal Integrated Circuit Card (eUICC) of a companion user device. Such OTA update failures may cause the companion user devices to experience various technical issues.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
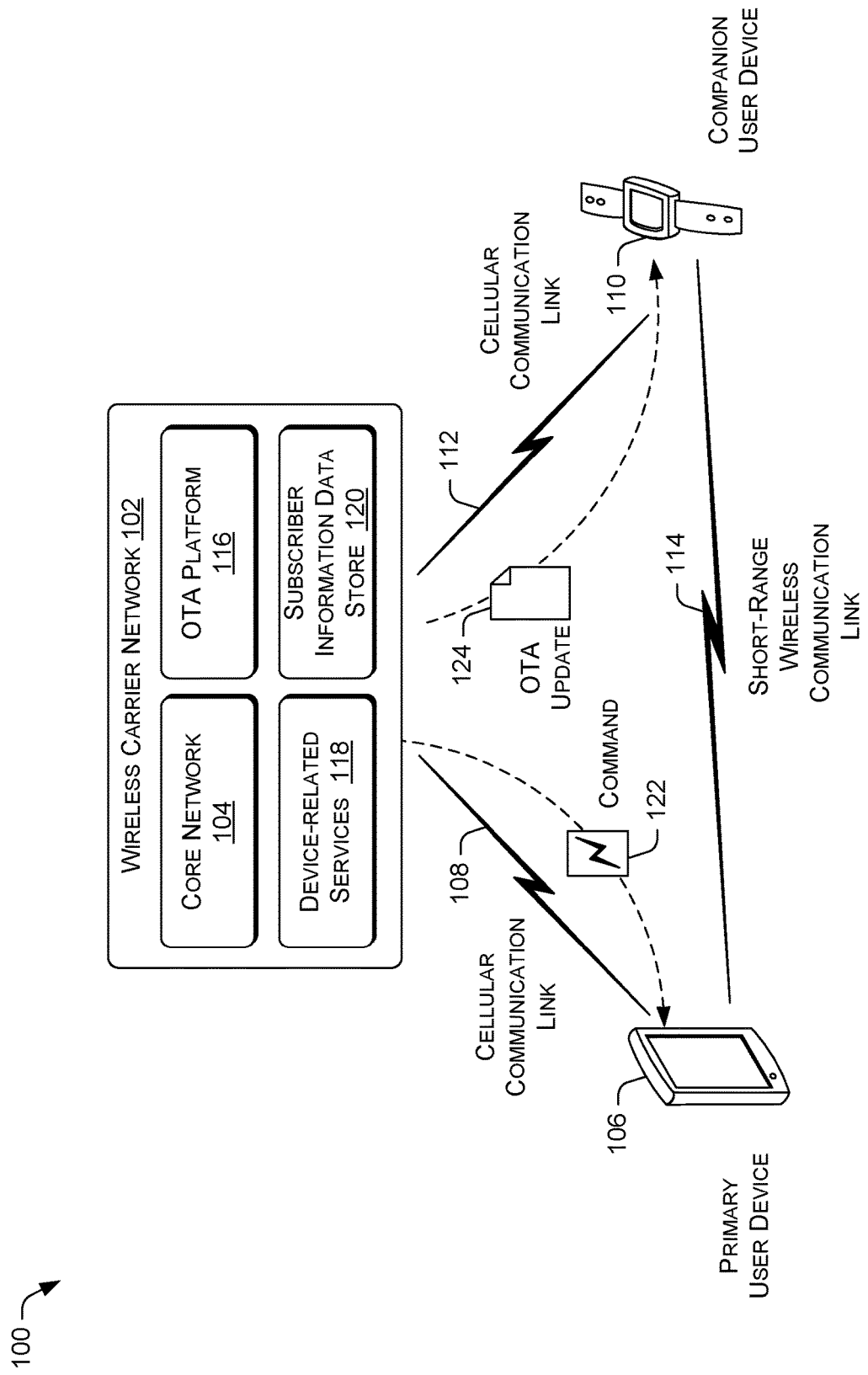
FIG. 1 illustrates an example architecture that enables an over-the-air (OTA) platform of a wireless carrier network to update a companion user device that is attached to a primary user device instead of the wireless carrier network.

This disclosure is directed to techniques for an over-the-air (OTA) platform of a wireless carrier network to update a companion user device that is wirelessly attached to a primary user device instead of a wireless carrier network. For example, the primary user device may be a smartphone, and the companion user device may be a smartwatch. Each of the primary user device and the companion user device has the ability to form a cellular communication link with the wireless carrier, as well as a short-range wireless communication link (e.g., Bluetooth) with another user device. The primary user device may have a subscription to use the wireless telecommunication services of the wireless carrier network to exchange data with other devices as well as access various networks, such as the Internet. The companion user device may form a short-range wireless communication link with the primary user device. In turn, the companion user device may use the short-range wireless communication link to wirelessly attach to the primary user device.

In this way, the companion user device may use the wireless telecommunication services available to the primary user device from the wireless carrier network to exchange data with other networked devices without connecting directly to the wireless carrier network. Accordingly, the companion user device may power off its cellular modem for prolonged periods of time. However, the powered-off cellular modem state of the companion user device may result in the companion user device being unable to receive over-the-air (OTA) updates from the wireless carrier network.

Thus, in order to provide an OTA update to the companion user device, the OTA platform of the wireless carrier network may command the primary user device to terminate an active short-range wireless communication link with the companion user device. This termination may trigger the companion user device to establish a cellular communication link with the wireless carrier network. Accordingly, the OTA platform may push the OTA update to the companion user device via the cellular communication link. In an alternative implementation, the OTA platform may initially attempt to send the OTA update to the companion user device via a cellular communication link. The OTA platform may take no further action if the OTA update is successful. However, the OTA platform may command the primary user device to terminate the active short-range wireless communication to force the companion user device to establish the cellular communication link with the wireless carrier network when the OTA update is unsuccessful. Subsequently, the OTA platform may once again push the OTA update to the companion user device via the cellular communication link.

In conventional implementations, the OTA platform typically retries an unsuccessful OTA update for a predetermined time period until the platform considers the OTA update to be a permanent failure. In such a scenario, a companion user device will be unable to receive an OTA update that has previously failed even if the companion user device subsequently disengages with a primary user device, powers up its cellular modem, and registers with the wireless carrier network. This may result not only in a decreased OTA success rate and the need for manual intervention by network engineers, but also delay of business and technical information to be received and acted upon by the companion user device. For example, a failure to update a Public Land Mobile Network (PLMN) list for an Embedded Subscriber Identity Module (eSIM) profile that is stored in an Embedded Universal Integrated Circuit Card (eUICC) of the companion user device may result in the companion user device having difficulty registering with and using some wireless carrier networks. The ability of the OTA platform to force the companion user device to terminate its short-range wireless communication link with a primary user device and wirelessly connect to the wireless carrier network to receive an OTA update may prevent the occurrence of such technical difficulties and issues. The techniques described herein may be implemented in a number of ways. Example implementations are provided below with reference to the following FIGS. 1-8.

Example Architecture

FIG. 1 illustrates an example architecture 100 that enables an OTA platform of a wireless carrier network to update a companion user device that is attached to a primary user device instead of the wireless carrier network. The wireless carrier network 102 may provide a wide range of mobile communication services, as well as ancillary services and features, to subscribers and associated mobile device users. The wireless carrier network 102 may be operated by a mobile network operator (MNO). In various embodiments, the wireless carrier network 102 may provide wireless communication between multiple user devices. Further, the wireless carrier network 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 of the wireless carrier network 102 by a wide area network (WAN). Each regional portion of the wireless carrier network 102 may include one or more RANs and a regional circuit and/or packet switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless carrier network 102 may be accessed via wired or wireless local area networks (LANs).

For example, a wireless local area network may be a network that is established using Wi-Fi or Bluetooth standards and hardware.

A RAN of the wireless carrier network 102 may include a number of base stations, also referred to as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless carrier network 102. The core network may connect to a public packet data communication network, such as the Internet. Data and voice communications via the RANs, the core network, and the Internet may support a variety of telecommunication services through the wireless carrier network 102.

In various embodiments, 2G and/or 3G network components in the core network 104 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless carrier network 102 may include an Evolved Packet Core (EPC) and an IP Multimedia Subsystem (IMS) core.

The wireless carrier network 102 may provide telecommunication services to a primary user device 106 via a cellular communication link 108. Likewise, the wireless carrier network 102 may provide telecommunication services to a companion user device 110 via a cellular communication link 112. Each of the cellular communication links may be established using a RAN of the wireless carrier network 102, and each link may encompass one or more communication sessions. Accordingly, the primary user device 106 and the companion user device 110 may be capable of obtaining telecommunication and/or data communication services from the wireless carrier network 102. For example, the primary user device 106 may be a smartphone, a tablet computer, or any other type of portable electronic device. The companion user device 110 may be a smartwatch, smart glasses, or any other type of wearable user device that is designed to be used in conjunction with another electronic device in the immediate vicinity of the primary user device 106. Each of the primary user device 106 and the companion user device 110 may be equipped with an eUICC, i.e., an integrated circuit chip that is directly wired or soldered to a circuit board of the user device. The eUICC may store one or more eSIM profiles, in which each eSIM profile may include information for accessing telecommunication services provided by one or more wireless carrier networks, such as the wireless carrier network 102. Each user device may be further equipped with a cellular modem that enables the user device to perform telecommunication and data communication with the wireless carrier network 102. Accordingly, the cellular modem may encode digital information for transmission in uplink radio signals to the wireless carrier network 102, as well as decode digital information that is received from the wireless carrier network 102 via downlink radio signals.

The primary user device 106 and the companion user device 110 may be further equipped with short-range transceivers (e.g., Bluetooth transceivers, near-field communication (NFC) transceivers, etc.) that enable the companion user device 110 to form a short-range wireless communication link 114 with the primary user device 106. The companion user device 110 may use the short-range wireless communication link 114 to wirelessly attach to the primary user device 106, in which the short-range wireless communication link 114 may support one or more communication sessions. In this way, the companion user device 110 may use the wireless telecommunication services available to the primary user device 106 from the wireless carrier network 102 to exchange data with other networked devices without connecting directly to the wireless carrier network 102. Accordingly, the companion user device 110 may power off its cellular modem for prolonged periods of time.

The backend servers of the wireless carrier network 102 may provide an OTA platform 116, device-related services 118, and a subscriber information data store 120. The OTA platform 116 may provide OTA updates to the user devices that use the telecommunication services of the wireless carrier network 102. In various embodiments, the OTA updates may include firmware updates, software updates for the various applications that are installed on the user devices, and/or profile updates to the eSIM profiles stored on the user devices. The OTA platform 116 may push OTA updates to the user devices on behalf of various entities. Such entities may include a subscription management service that is responsible for the management of eSIM profiles that are provisioned to the eUICCs of user devices, the wireless carrier network 102, or a third-party partner of the wireless carrier network 102 that provides content or services to the subscribers of the network. For example, an OTA update for an eSIM profile may activate an eSIM profile for use, modify a Public Land Mobile Network (PLMN) list stored in the eSIM profile, or modify a forbidden PLMN list stored in the eSIM profile.

The OTA updates to be pushed to a particular user device may include an OTA update that is pre-stored in an OTA update store of the OTA platform 116 for an entity. Accordingly, the entity may send an update command to direct the OTA platform 116 to provide the OTA update to the particular user device. For example, the update command may include an OTA identifier of the OTA update, a user device identifier of the particular user device, and an instruction to initiate the transfer of the OTA update to the particular user device. Additionally, or alternatively, the OTA updates to be pushed to a particular user device may include an OTA update that is transferred to the OTA platform 116 by an entity via a file transfer service. Such transfer of the OTA update may be accompanied by an OTA identifier of the OTA update, a user device identifier of the particular user device, and an instruction to initiate a delivery of the OTA update to the particular user device.

The device-related services 118 may include a device registration service that registers user devices for use by subscribers. For example, the device registration service may be provided by a Call Session Control Function (CSCF) node of the core network 104. In various embodiments, the device registration service may initially receive a registration request from a user device that includes a device identifier. The device registration service may receive the registration request as a part of a device activation procedure for the user device with the wireless carrier network 102. For example, the device identifier may be an International Mobile Station Equipment Identity (IMEI), a Mobile Equipment Identifier (MEID), or some other electronic serial number (ESN) of the user device. In turn, the device registration service may use a subscriber database to determine based on the user identifier that the user device is assigned to a particular subscriber.

Further, the device registration service may use a device database, such as an Equipment Identity Register (EIR), to determine whether the user device is a primary user device or a companion user device. For example, the device database may include a list of user identifiers of user devices that are classified as corresponding to companion user devices. Accordingly, if the device registration service determines that the user device is classified as a companion user device (e.g., companion user device 110), the device registration service may register the user device in a subscriber account of the subscriber as a companion device that is associated with a primary user device (e.g., primary user device 106) of the subscriber. In this context, the association of a primary user device with a companion user device may be accomplished by associating the eUICC Identifier (eUICC ID) of the eUICC embedded in the primary user device with the eUICC ID of the eUICC embedded in the companion user device. Such association data and registration information may be stored by the device registration service in the subscriber information data store 120. In various embodiments, the subscriber information data store 120 may include one or more databases that are maintained by the Business Support Systems (BSS) of the wireless carrier network 102. On the other hand, if the device registration service determines that the user device is not a companion user device, the device registration service may register the user device in the subscriber account of the subscriber as a primary user device.

The device-related services 118 may further include services that enable the OTA platform 116 to deliver OTA updates and OTA-related commands to user devices. These services may include a messaging service, a file transfer service, and/or so forth. In some embodiments, the messaging service may be performed by a Short Messaging Service Center (SMSC) function, a Multimedia Messaging Service Center (MMSC) function, or another messaging function of the core network 104. The messages sent by the messaging service may include binary short message service (SMS) messages, multimedia messaging service (MMS) messages, rich communication service (RCS) messages, and/or so forth. The file transfer service may use various transfer protocols to send an OTA update to a user device, such as Secure Copy Protocol (SCP), Secure File Transfer Protocol (SFTP), HTTP Secure (HTTPS), and/or so forth. In some embodiments, the device-related services 118 may include functions that enable the OTA platform 116 to interface with and call upon third-party services to deliver OTA updates and OTA-related commands to user devices. For example, such third-party services may include Google Cloud Messaging (GCM), Apple Push Notification service (APNs), and/or so forth.

In an example implementation, the OTA platform 116 may receive a request from a requesting entity to provide the OTA update 124 to a user device. In turn, the OTA platform 116 may use the subscriber information data store 120 to determine whether the user device is a companion user device (e.g., the companion user device 110). If so, the OTA platform 116 may further use the subscriber information database to identify that the primary user device (e.g., the primary user device 106) is associated with the companion user device. Accordingly, the OTA platform 116 may use a messaging service to send a command 122 to the primary user device 106 via the cellular communication link 108. The command 122 may cause the primary user device 106 to terminate any active short-range wireless communication link (e.g., the short-range wireless communication link 114) with the companion user device 110. The termination of the short-range wireless communication link may trigger the companion user device 110 to establish the cellular communication link 112 with the wireless carrier network 102. Following the establishment of the cellular communication link 112, the OTA platform 116 may use a messaging service or a file transfer service to push an OTA update 124 to the companion user device 110 via the cellular communication link 112. Subsequently, the OTA platform 116 may receive an acknowledgment message from the messaging service or the file transfer service indicating that the OTA update 124 was successfully delivered to the companion user device 110. Accordingly, the OTA platform 116 may send a notification of the successful OTA update to the requesting entity.

In an alternative implementation, the OTA platform 116 may receive a request from a requesting entity to provide the OTA update to the user device. In turn, the OTA platform 116 may initially attempt to send the OTA update to the user device via a messaging service or a file transfer service. Accordingly, if the user device is a primary user device (e.g., the primary user device 106) that is connected to the wireless carrier network 102, or a companion user device (e.g., the companion user device 110) that is already connected to the wireless carrier network 102 via a cellular communication link, the OTA platform 116 may successfully update the user device with the OTA update via the cellular communication link. For example, the OTA platform 116 may receive an acknowledgment message from the messaging service or the file transfer service indicating that the OTA update was successfully delivered to the user device. As such, the OTA platform 116 may take no further action other than sending a notification of the successful OTA update to the requesting entity.

However, if the OTA platform 116 fails to deliver the OTA update to the user device, the OTA platform 116 may use the subscriber information data store 120 to determine whether the user device is a companion user device (e.g., the companion user device 110). If so, the OTA platform 116 may further use the subscriber information database to identify that the primary user device (e.g., the primary user device 106) is associated with the companion user device. Accordingly, the OTA platform 116 may command the primary user device 106 to terminate any active short-range wireless communication link (e.g., the short-range wireless communication link 114) with the companion user device 110. Once again, the termination of the short-range wireless communication link may trigger the companion user device 110 to establish the cellular communication link 112 with the wireless carrier network 102. Following the establishment of the cellular communication link 112, the OTA platform 116 may use a messaging service or a file transfer service to push an OTA update 124 to the companion user device 110 via the cellular communication link 112.

The alternative implementation of the OTA platform 116 may provide certain benefits over the former implementation. Generally speaking, the vast majority of user devices that use the telecommunication services of the wireless carrier network 102 are primary user devices (e.g., 90%) rather than companion user devices (e.g., 10%). Thus, the alternative implementation may reduce the number of queries to the subscriber information data store 120. This is because a query is only performed in the alternative implementation when (1) the user device that is to receive the OTA update is a companion user device rather than a primary user device; and (2) the companion user device is not wirelessly engaged with the wireless carrier network 102 at the time of the OTA update or if the OTA update for the companion user device otherwise fails.

Example Computing Device Components

Figure 2:
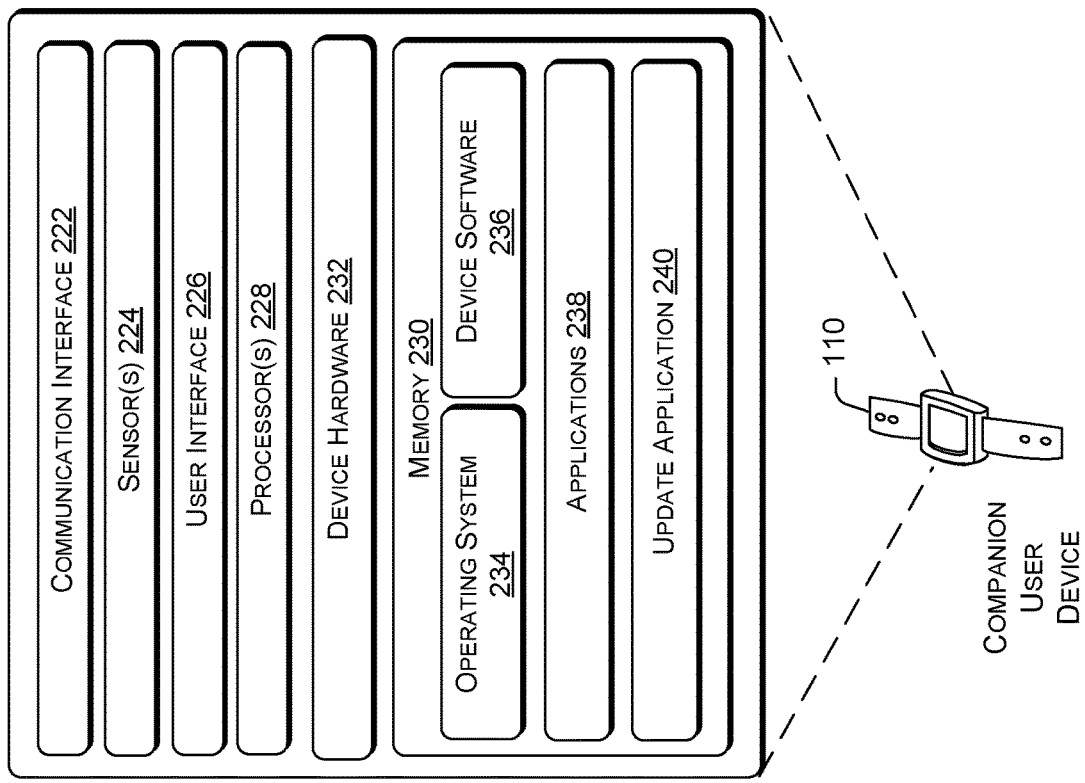
FIG. 2 is a block diagram showing various components of an illustrative primary user device and a companion user device that support the OTA update of the companion user device.
Figure 2:
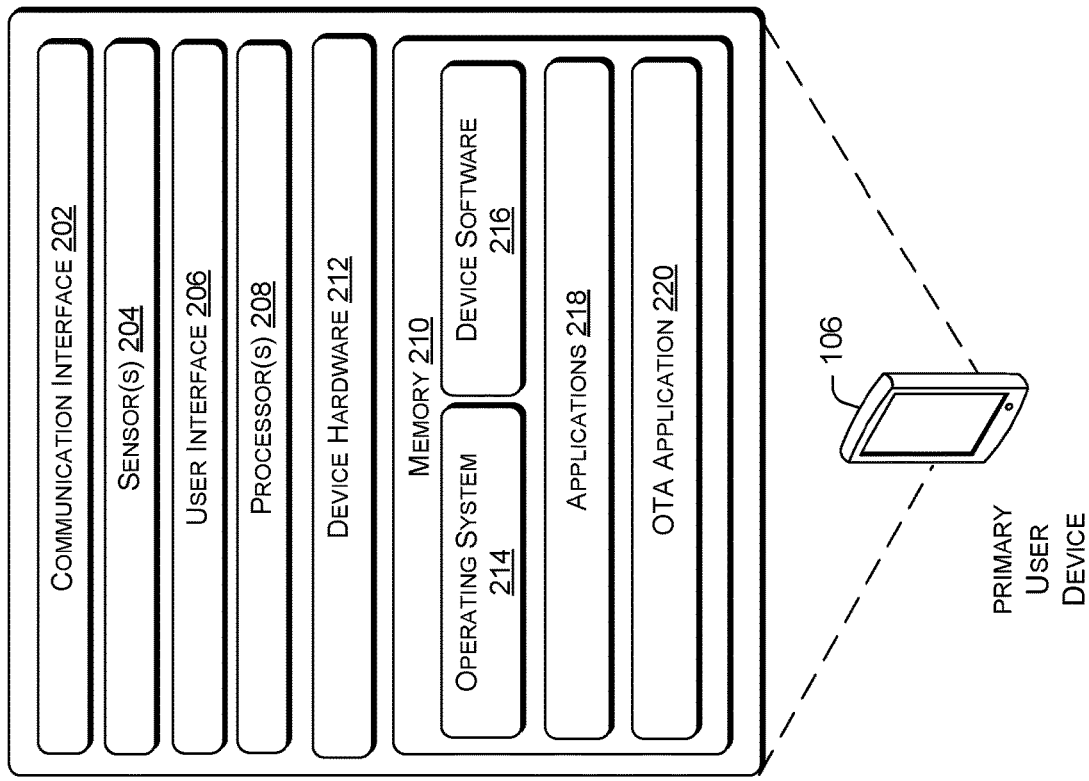

FIG. 2 is a block diagram showing various components of an illustrative primary user device and a companion user device that support the OTA update of the companion user device. The primary user device 106 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect the movement of objects that are proximate to the primary user device 106. The compass, the accelerometer, and the GPS sensor may detect orientation, movement, and geolocation of the primary user device 106. The cameras may capture images of the environment around the primary user device 106.

The user interface 206 may enable a user to provide inputs and receive outputs from the primary user device 106. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a cellular modem that enables the primary user device 106 to perform telecommunication and data communication with the wireless carrier network 102, as well as a short-range transceiver that enables the device to connect to other devices via short-range wireless communication links. The device hardware 212 may further include signal converters, antennas, hardware decoders and encoders, graphics processors, and/or the like that enable the primary user device 106 to execute applications and provide telecommunication and data communication functions.

The one or more processors 208 and the memory 210 of the primary user device 106 may implement an operating system 214, device software 216, one or more applications 218, and an OTA application 220. Such software may include routines, program instructions, objects, and/or data structures that are executed by the processors 208 to perform particular tasks or implement particular abstract data types.

The operating system 214 may include components that enable the primary user device 106 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the primary user device 106 and executes the operating system 214 following power-up of the device.

The applications 218 may include applications that provide utility, entertainment, and/or productivity functionalities to a user of the primary user device 106. For example, the applications 218 may include telephony applications, electronic mail applications, remote desktop applications, web browser applications, navigation applications, office productivity applications, multimedia streaming applications, an online shopping application, and/or so forth.

The OTA application 220 may be configured to terminate an active short-range wireless communication link (e.g., the short-range wireless communication link 114) with a companion user device (e.g., the companion user device 110) in response to a termination command from the OTA platform 116. For example, the OTA application 220 may use a script or a command to direct the operating system 214 to selectively deactivate the short-range wireless communication link 114 with the companion user device 110 or switch off the short-range transceiver of the primary user device 106 entirely. In some embodiments, the OTA application 220 may include a countdown timer function. The countdown timer function may initiate a countdown of a predetermined time period when the short-range wireless communication link 114 is terminated. At the expiration of the predetermined time period, the OTA application 220 may reestablish the short-range wireless communication link 114 between the primary user device 106 and the companion user device 110. For example, the OTA application 220 may use a script or a command to direct the operating system 214 to specifically reestablish the short-range wireless communication link 114 with the companion user device 110. Alternatively, the OTA application 220 may use the script or the command to switch on the short-range transceiver of the primary user device 106, so that short-range wireless communication link 114 may be automatically established by the primary user device 106. The use of the countdown timer function may ensure that the companion user device 110 is not indefinitely disconnected.

In some implementations, the OTA application 220 may be a general utility application that is provided by the operator of the wireless carrier network 102 for installation on the primary user device 106. Accordingly, the OTA application 220 may perform additional functions, such as enabling a user of the primary user device 106 to switch between different telecommunication service subscription plans, check and pay balances for a subscription plan, interacting with customer service representatives via instant messages, learn about subscription and user device offerings of the wireless carrier network 102, and/or so forth.

The companion user device 110 may include a communication interface 222, one or more sensors 224, a user interface 226, one or more processors 228, memory 230, and device hardware 232. The communication interface 222 may include wireless and/or wired communication components that enable the electronic device to transmit or receive voice or data communication via the wireless carrier network, as well as other telecommunication and/or data communication networks. The sensors 224 may include a proximity sensor, a compass, an accelerometer, biometric sensors, cameras, and/or a global positioning system (GPS) sensor, among other appropriate sensors. The proximity sensor may detect the movement of objects that are proximate to the primary user device 106. The compass, the accelerometer, and the GPS sensor may detect orientation, movement, and geolocation of the companion user device 110. The cameras may capture images of the environment around the companion user device 110.

The user interface 226 may enable a user to provide inputs and receive outputs from the companion user device 110. The user interface 226 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 230 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 232 may include a cellular modem that enables the companion user device 110 to perform telecommunication and data communication with the wireless carrier network 102, as well as a short-range transceiver that enables the device to connect to other devices via short-range wireless communication links. The device hardware 232 may further include signal converters, antennas, hardware decoders and encoders, graphics processors, a UICC, an eUICC, and/or the like that enable the companion user device 110 to execute applications and provide telecommunication and data communication functions.

The one or more processors 228 and the memory 230 of the primary user device 106 may implement an operating system 234, device software 236, one or more applications 238, and an update application 240. Such software may include routines, program instructions, objects, and/or data structures that are executed by the processors 228 to perform particular tasks or implement particular abstract data types.

The operating system 234 may include components that enable the companion user device 110 to receive and transmit data via various interfaces (e.g., user controls, communication interface 222, and/or memory input/output devices). The operating system 234 may also process data using the one or more processors 228 to generate outputs based on inputs that are received via the user interface 226. For example, the operating system 234 may provide an execution environment for the execution of the applications 238. The operating system 234 may include a presentation component that presents the output (e.g., display the data on an electronic display, store the data in memory, transmit the data to another electronic device, etc.).

The operating system 234 may include an interface layer that enables applications to interface with the modem and/or the communication interface 222. The interface layer may comprise public APIs, private APIs, or a combination of both public APIs and private APIs. Additionally, the operating system 234 may include other components that perform various other functions generally associated with an operating system. The device software 216 may include software components that enable the user device to perform functions. For example, the device software 236 may include basic input/output system (BIOS), bootrom, or a bootloader that boots up the primary user device 106 and executes the operating system 234 following power-up of the device.

The applications 238 may include applications that provide utility, entertainment, and/or productivity functionalities to a user of the primary user device 106. For example, the applications 238 may include telephony applications, electronic mail applications, remote desktop applications, web browser applications, navigation applications, office productivity applications, multimedia streaming applications, an online shopping application, and/or so forth.

The update application 240 may be responsible for receiving an OTA update (e.g., the OTA update 124) from the OTA platform 116 and implementing the OTA update. In some embodiments, the update application 240 may transfer an eSIM profile update to an eUICC of the companion user device 110. In other embodiments, the update application 240 may install a software or firmware update on the companion user device 110. Accordingly, the update application 240 may include an interface function that establishes a communication session with a messaging service or a file transfer service to receive the OTA update via an OTA update session, a buffer function that stores an incoming OTA update file, a conversion function that decrypts, validates, reformats, compiles and/or assembles the received OTA update file into a usable data file. The update application 240 may further include an installation function that executes the OTA update file or stores the OTA update file into a destination file location, and a notification function that provides update success or failure notifications to the OTA platform 116 via a messaging service. For example, the notification function may send a failure notification when an error occurs with the storage or installation of the OTA update file.

In some embodiments, the update application 240 may include a reengagement function that automatically prompts the companion user device 110 to reengage with the primary user device 106 following the sending of the success or failure notification to the OTA platform 116 via the cellular communication link 112. The reengagement involves terminating the cellular communication link 112 and reestablishing the short-range wireless communication link 114 with the primary user device 106. For example, the update application 240 may use a script or a command to direct the operating system 234 to specifically reestablish the short-range wireless communication link 114 with the primary user device 106. In alternative embodiments, the reengagement function of the update application 240 may have the ability to track a first date/time in which a current communication session via the cellular communication link 112 is initially established, as well as track a second date/time for when the OTA update session is initiated. When the first date/time precedes the second date/time by a predetermined threshold amount of time, the presumption is that the companion user device 110 was already connected to the wireless carrier network 102 via the cellular communication link 112 prior to the initiation of the OTA update. Accordingly, when the predetermined threshold amount of time is exceeded, the reengagement function may refrain from prompting the companion user device 110 to reengage with the primary user device 106 following the sending of the success or failure notification to the OTA platform 116 via the cellular communication link 112. This means that the companion user device 110 will remain connected to the wireless carrier network 102. In this way, the update application 240 may work in conjunction with the OTA application 220 to ensure that the companion user device 110 110 is not indefinitely disconnected.

Example OTA Platform

Figure 3:
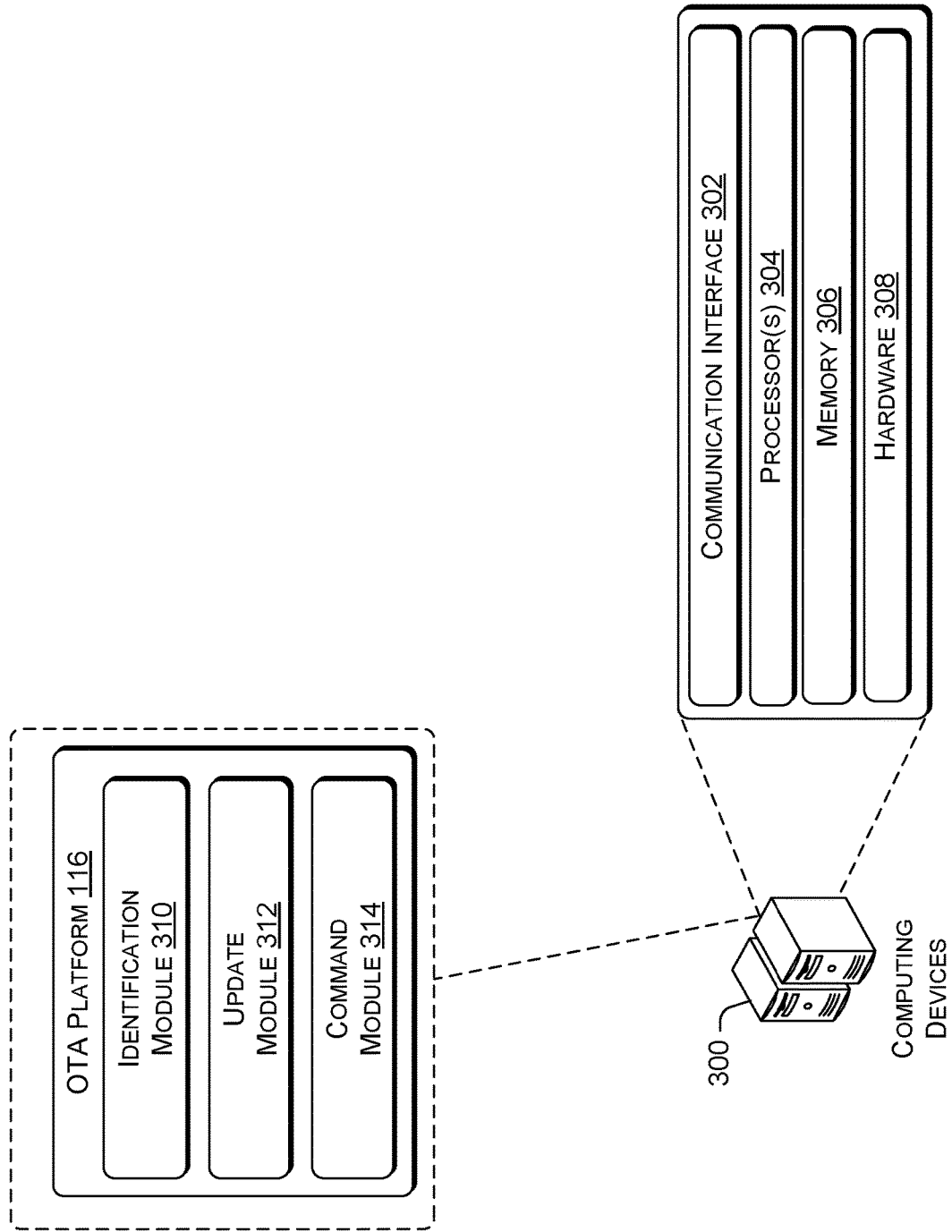
FIG. 3 is a block diagram showing various components of one or more illustrative computing devices that support the OTA update of the companion user device that is attached to a primary user device instead of the wireless carrier network.

FIG. 3 is a block diagram showing various components of one or more illustrative computing devices that support the OTA update of the companion user device that is attached to a primary user device instead of the wireless carrier network. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 300 or components thereof may be virtual computing devices in the form of virtual machines or software containers that are hosted in a computing cloud.

The computing devices 300 may implement various backend services and components of the wireless carrier network 102, such as the OTA platform 116. The OTA platform 116 may include an identification module 310, an update module 312, and a command module 314. The modules may include routines, code segments, program instructions, objects, and/or data structures that perform particular tasks or implement particular abstract data types.

The identification module 310 may send a query to the subscriber information data store 120 to determine whether a user device is a primary user device or a companion user device in response to a request from an entity to provide an OTA update to the user device. In response to a determination that the user device is a companion user device, the identification module 310 may further identify a primary user device that is associated with the companion user device.

The update module 312 may deliver OTA updates to user devices. In various embodiments, the update module 312 may include a retrieval function that receives an OTA update from a computing device of an entity via a file transfer service or retrieves an OTA update from a data store in response to a request from the entity. The request from the entity may include identification information of the OTA update (e.g., update name, release version, etc.), an identifier of a target user device for the OTA update, instructions for executing the OTA update (e.g., source of the OTA update, time/date of update delivery, delivery service method, security settings for the delivery, number of delivery retry attempts, etc.), and/or so forth.

The update module 312 may include an interface function that directs a messaging service or a file transfer service to establish a communication session for transferring an OTA update to the target user device. In some embodiments, the update module 312 may further include a conversion function that performs encryption, validation, formatting, and/or other preparation tasks to ready the OTA update for transfer to the target user device. A notification function of the update module 312 may receive update success or failure notifications from a target user device via a messaging service. In turn, the update module 312 may use the messaging service to notify the entity of the success or failure of the OTA update for a target user device.

In some implementations, the update module 312 may direct the identification module 310 to identify a primary user device that is associated with a companion user device prior to attempting to deliver an OTA update to the companion user device. The identity of the primary user device is then used by the update module 312 to sever any short-range communication link between the primary user device and the companion user device. In other implementations, the update module 312 may direct the identification module 310 to perform such an identification task after an initial attempt to deliver an OTA update to a target user device has failed.

The command module 314 may be directed by the update module 312 to deliver a termination command to a primary user device. The termination command may direct the primary user device to terminate a short-range wireless communication link with an associated companion user device. In various embodiments, the command module 314 may send the termination command to the primary user device via a messaging service. In some implementations, the messaging service may be provided by an SMSC function or an MMSC function of the wireless carrier network 102. In other implementations, the messaging service may be a third-party service, such as GCM or APN. In various embodiments, the update module 312 may wait for a predetermined amount of time following the sending of the termination command to the primary user device before initiating a transfer of the OTA update to the companion user device. The predetermined amount of time may enable the companion user device to form a cellular communication link with the wireless carrier network 102.

Example Processes

FIGS. 4-8 present illustrative processes 400-800 for an OTA platform of a wireless carrier network to update a companion user device that is associated with a primary user device. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
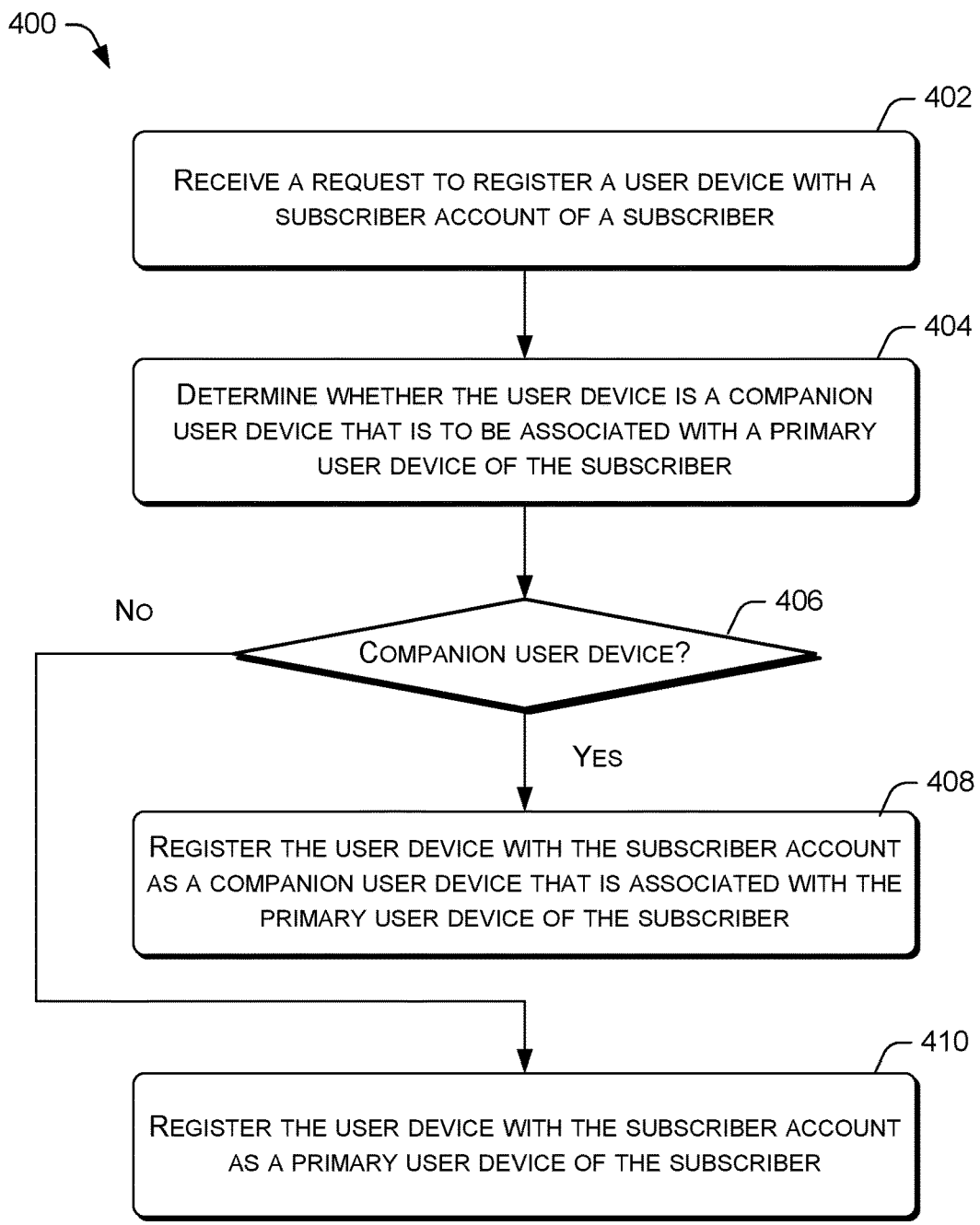
FIG. 4 is a flow diagram of an example process for registering a companion user device as being associated with a primary user device in a subscriber account.

FIG. 4 is a flow diagram of an example process 400 for registering a companion user device as being associated with a primary user device in a subscriber account. At block 402, a device registration service of the wireless carrier network 102 may receive a request to register a user device with a subscriber account of a subscriber. In various embodiments, the device registration service may use a subscriber database to determine based on a user identifier included in the request that the user device is assigned to a particular subscriber.

At block 404, the device registration service may determine whether the user device is a companion user device that is to be associated with a primary user device of the subscriber. In various embodiments, the device registration service may use a device database, such as an EIR, to determine whether the user device is a primary user device or a companion user device. For example, the device database may include a list of user identifiers of user devices that are classified as corresponding to companion user devices.

At decision block 406, if the device registration service determines that the user device is a companion user device ("yes" at decision block 406), the process 400 may proceed to block 408. At block 408, the device registration service may register the user device with the subscriber account as a companion user device that is associated with a primary user device of the subscriber. In various embodiments, the association of a primary user device with a companion user device may be accomplished by associating the eUICC ID of the eUICC embedded in the primary user device with the eUICC ID of the eUICC embedded in the companion user device. Such association data and registration information may be stored by the device registration service in the subscriber information data store 120.

Returning to decision block 406, if the device registration service determines that the user device is not a companion user device ("no" at decision block 406), the process 400 may proceed to block 410. At block 410, the device registration service may register the user device with the subscriber account as a primary user device of the subscriber. In various embodiments, such registration information may be stored in the subscriber information data store 120.

Figure 5:
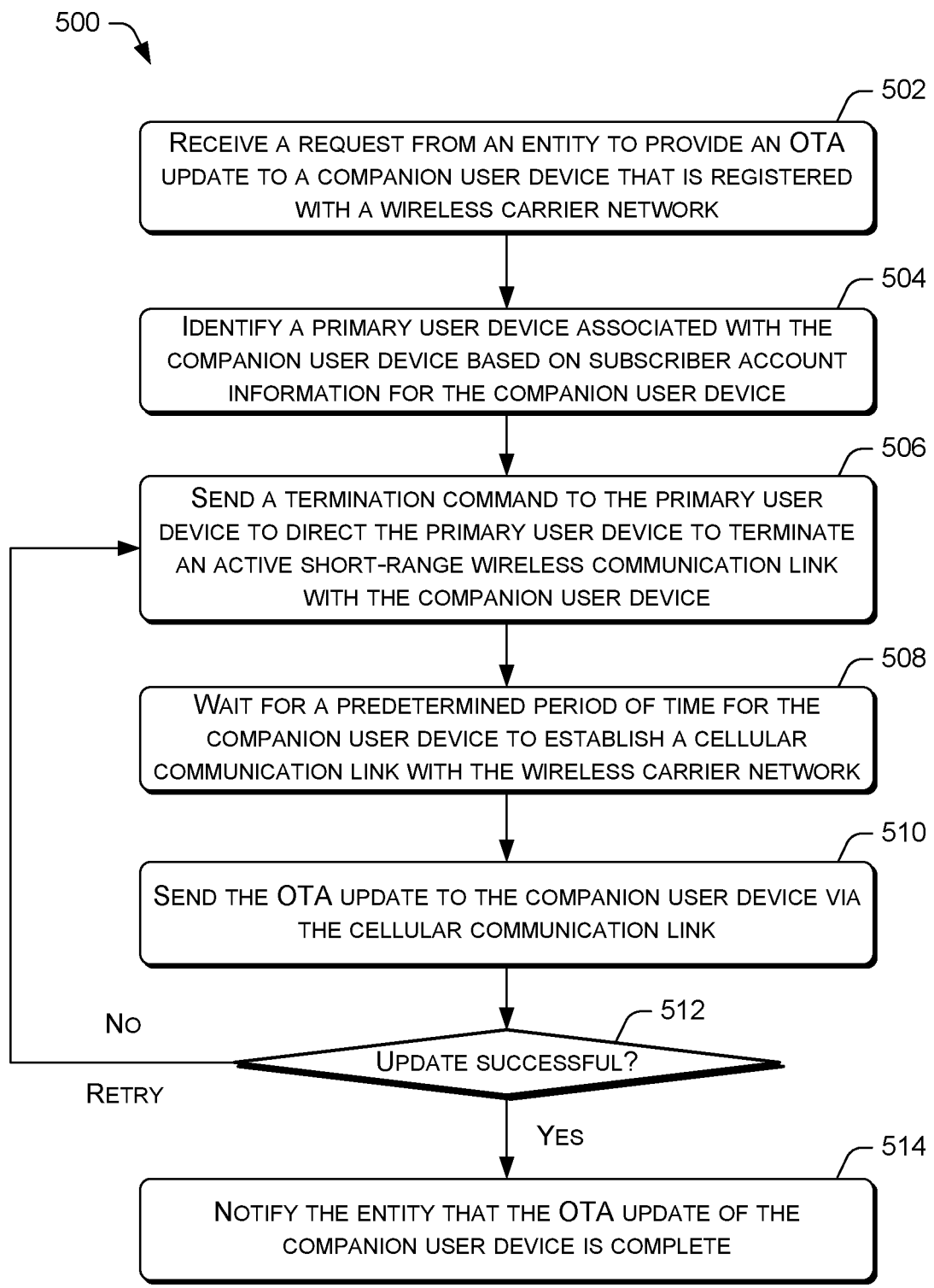
FIG. 5 is a flow diagram of a first example process for an OTA platform of a wireless carrier network to update a companion user device that is attached to a primary user device instead of the wireless carrier network.

FIG. 5 is a flow diagram of a first example process 500 for an OTA platform of a wireless carrier network to update a companion user device that is attached to a primary user device instead of the wireless carrier network. At block 502, the OTA platform 116 may receive a request from an entity to provide an OTA update to a companion user device that is registered with a wireless carrier network 102. In various embodiments, the request from the entity may include identification information of the OTA update (e.g., update name, release version, etc.), an identifier of a target user device for the OTA update, instructions for executing the OTA update (e.g., source of the OTA update, time/date of update delivery, delivery service method, security settings for the delivery, number of delivery retry attempts, etc.), and/or so forth.

At block 504, the OTA platform 116 may identify a primary user device associated with the companion user device based on subscriber account information for the companion user device. In various embodiments, the subscriber account information may be stored in the subscriber information data store 120. At block 506, the OTA platform 116 may send a termination command to the primary user device to terminate an active short-range wireless communication link with the companion user device. In various embodiments, the OTA platform 116 may send the termination command to the primary user device via a messaging service. In some implementations, the messaging service may be provided by an SMSC function or an MMSC function of the wireless carrier network 102. In other implementations, the messaging service may be a third-party service, such as GCM or APN.

At block 508, the OTA platform 116 may wait for a predetermined period of time for the companion user device to establish a cellular communication link with the wireless carrier network 102. At block 510, the OTA platform 116 may send the OTA update to the companion user device via the cellular communication link. In various embodiments, the OTA update may be delivered to the companion user device via a messaging service or a file transfer service that is operated the wireless carrier network 102 or a third-party service provider.

At block 510, the OTA platform 116 may determine whether the OTA update of the companion user device is successful. In various embodiments, the companion user device may send a notification of the OTA update successful or failure via a messaging service to the OTA platform 116. Further, the OTA platform 116 may determine that the OTA update failed if no notification is received from the companion user device within a predetermined amount of time. At decision block 512, if the OTA update is successful ("yes" at decision block 512), the process 500 may proceed to block 514. At block 514, the OTA platform 116 may notify the entity that the OTA update of the companion user device is complete. In some embodiments, the OTA platform 116 may use a messaging service to notify the entity.

Returning to decision block 512, if the OTA update is unsuccessful ("no" at decision block 512), the process 500 may return to block 506. In various embodiments, the process 500 may return to block 506 for a predetermined number of retry attempts, if applicable, before the OTA platform 116 determines that the OTA update has failed. At that point, the OTA platform 116 may notify the entity of the OTA update failure.

Figure 6:
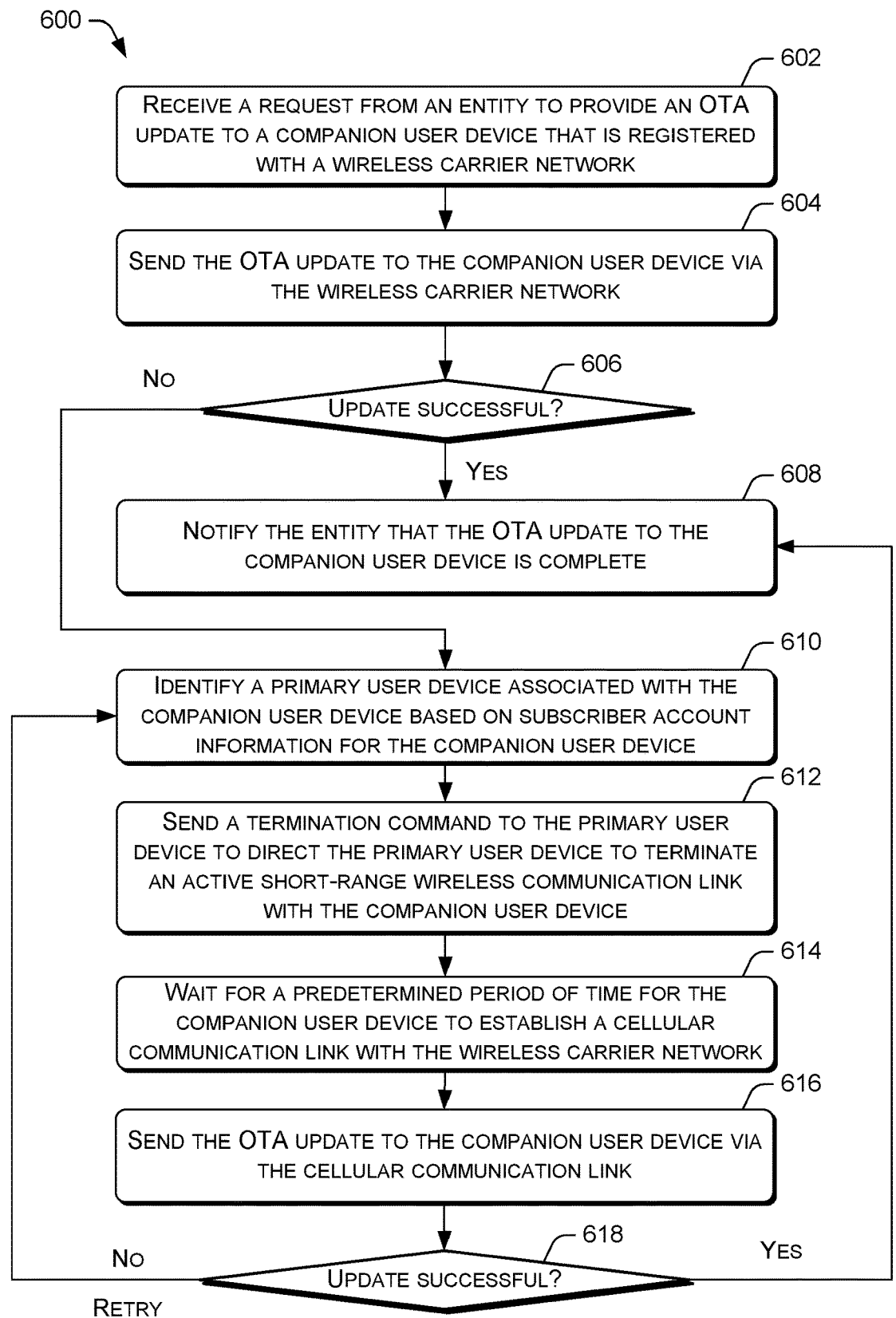
FIG. 6 is a flow diagram of a second example process for an OTA platform of a wireless carrier network to update a companion user device that is attached to a primary user device instead of the wireless carrier network.

FIG. 6 is a flow diagram of a second example process 600 for an OTA platform of a wireless carrier network to update a companion user device that is attached to a primary user device instead of the wireless carrier network. At block 602, the OTA platform 116 may receive a request from an entity to provide an OTA update to a companion user device that is registered with a wireless carrier network 102. In various embodiments, the request from the entity may include identification information of the OTA update (e.g., update name, release version, etc.), an identifier of a target user device for the OTA update, instructions for executing the OTA update (e.g., source of the OTA update, time/date of update delivery, delivery service method, security settings for the delivery, number of delivery retry attempts, etc.), and/or so forth.

At block 604, the OTA platform 116 may send the OTA update to the companion user device via the wireless carrier network 102. At this point, the OTA platform 116 has no knowledge whether the companion user device is connected to the wireless carrier network 102 via an existing cellular communication link or connected to a primary user device via a short-range communication link. Instead, the OTA platform 116 is attempting the OTA update regardless of the connectivity status of the companion user device.

At decision block 606, the OTA platform 116 may determine whether the OTA update is successful. For example, the companion user device may send a notification of the OTA update success via a messaging service to the OTA platform 116 if the companion user device is connected to the wireless carrier network via a cellular communication link. The OTA platform 116 may also determine that the OTA update failed if no notification is received within a predetermined time period. Accordingly, if the OTA update is successful ("yes" at decision block 606), the process 600 may proceed to block 608. At block 608, the OTA platform 116 may notify the entity that the OTA update to the companion user device is complete. In some embodiments, the OTA platform 116 may use a messaging service to notify the entity.

Returning to decision block 606, if the OTA platform 116 determines that the OTA update is not successful ("no" at decision block 606), the process 600 may proceed to block 610. At block 610, the OTA platform 116 may identify a primary user device associated with the companion user device based on subscriber account information for the companion user. In various embodiments, the subscriber account information may be stored in the subscriber information data store 120. At block 612, the OTA platform 116 may send a termination command to the primary user device to terminate an active short-range wireless communication link with the companion user device. In various embodiments, the OTA platform 116 may send the termination command to the primary user device via a messaging service. In some implementations, the messaging service may be provided by an SMSC function or an MMSC function of the wireless carrier network 102. In other implementations, the messaging service may be a third-party service, such as GCM or APN.

At block 614, the OTA platform 116 may wait for a predetermined period of time for the companion user device to establish a cellular communication link with the wireless carrier network 102. At block 616, the OTA platform 116 may send the OTA update to the companion user device via the cellular communication link. In various embodiments, the OTA update may be delivered to the companion user device via a messaging service or a file transfer service that is operated the wireless carrier network 102 or a third-party service provider.

At decision block 618, the OTA platform 116 may determine whether the OTA update of the companion user device is successful. In various embodiments, the companion user device may send a notification of the OTA update successful or failure via a messaging service to the OTA platform 116. Further, the OTA platform 116 may determine that the OTA update failed if no notification is received from the companion user device within a predetermined amount of time. Accordingly, if the OTA update is successful ("yes" at decision block 618), the process 600 may loop back to block 608.

Returning to decision block 618, if the OTA update is unsuccessful ("no" at decision block 618), the process 600 may return to block 610. In various embodiments, the process 600 may return to block 610 for a predetermined number of retry attempts, if applicable, before the OTA platform 116 determines that the OTA update has failed. At that point, the OTA platform 116 may notify the entity of the OTA update failure.

Figure 7:
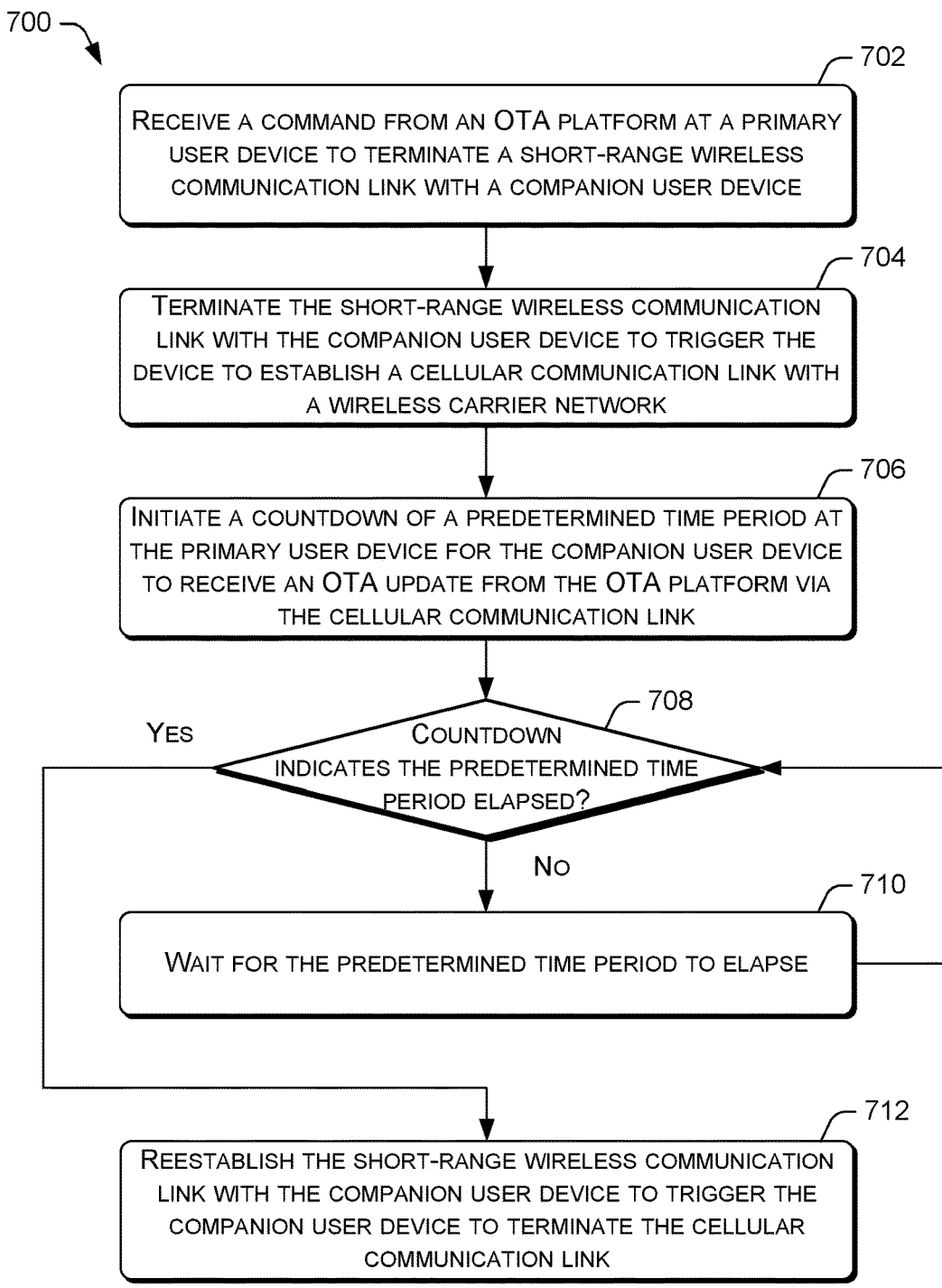
FIG. 7 is a flow diagram of an example process for a primary user device to trigger a companion user device to reestablish a short-range wireless communication link with the primary user device following an OTA update.

FIG. 7 is a flow diagram of an example process 700 for a primary user device to trigger a companion user device to reestablish a short-range wireless communication link with the primary user device following an OTA update. At block 702, the primary user device may receive a command from the OTA platform 116 to terminate a short-range wireless communication link with a companion user device. In various embodiments, the primary user device may receive the command via a messaging service. At block 704, the primary user device may terminate the short-range wireless communication link with the companion user device to trigger the companion user device to establish a cellular communication link with the wireless carrier network 102.

At block 706, the primary user device may initiate a countdown of a predetermined period of time at the primary user device for the companion user device to receive an OTA update from the OTA platform via the cellular communication link. At decision block 708, if the countdown indicates that the predetermined time period has not elapsed ("no" at decision block 708), the process 700 may proceed to block 710. At block 710, the primary user device may wait for the predetermined time period to elapse. Subsequently, the process 700 may loop back to decision block 708. However, if the countdown indicates that the predetermined time period has elapsed ("yes" at decision block 708), the process 700 may proceed to block 712. At block 712, the primary user device may reestablish the short-range wireless communication link with the companion user device to trigger the companion user device to terminate the cellular communication link with the wireless carrier network 102.

Figure 8:
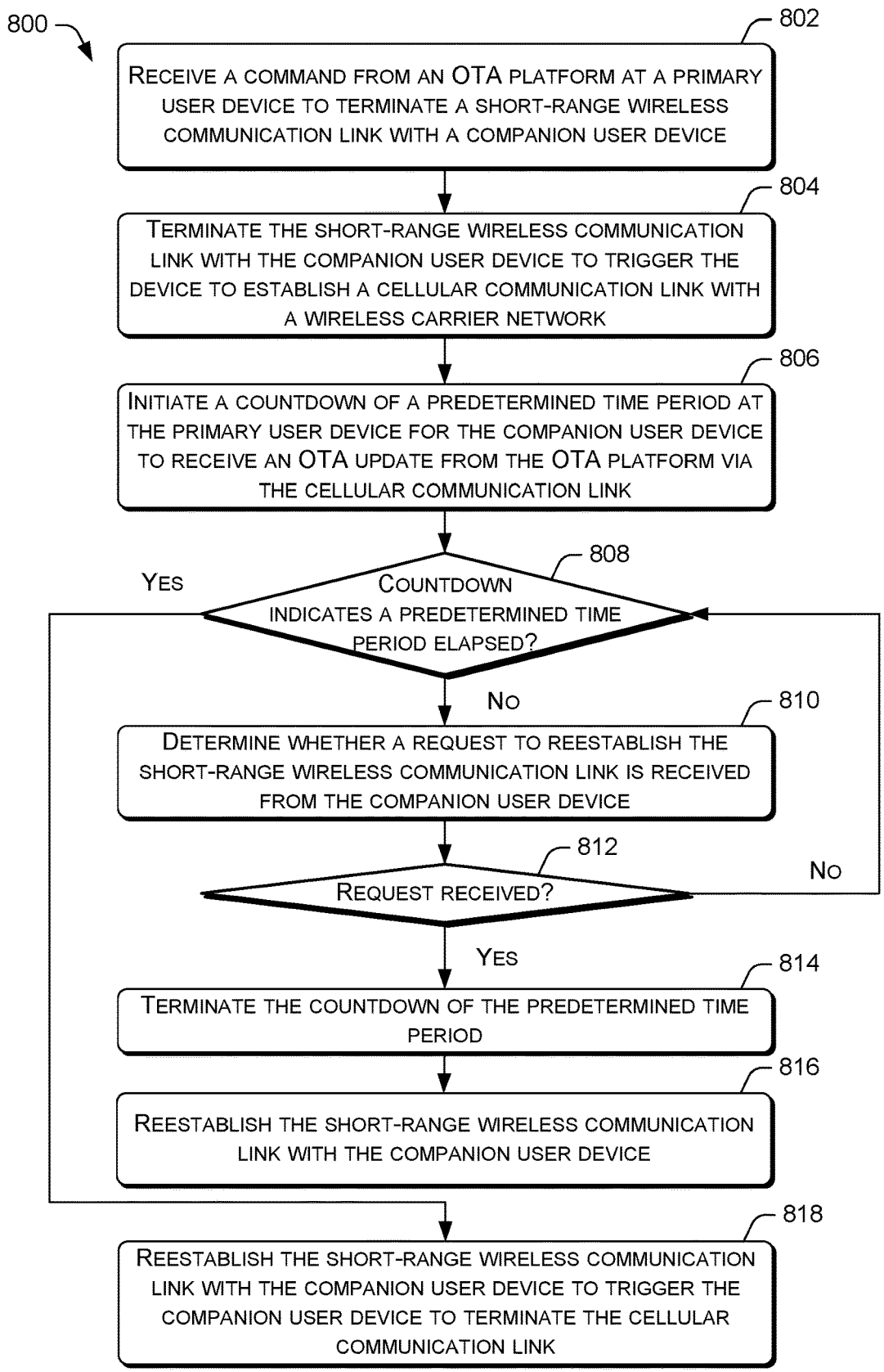
FIG. 8 is a flow diagram of an example process for a companion user device to cooperatively reestablish a short-range wireless communication link with the primary user device following an OTA update.

FIG. 8 is a flow diagram of an example process 800 for a companion user device to cooperatively reestablish a short-range wireless communication link with the primary user device following an OTA update. At block 802, the primary user device may receive a command from the OTA platform 116 to terminate a short-range wireless communication link with a companion user device. In various embodiments, the primary user device may receive the command via a messaging service. At block 804, the primary user device may terminate the short-range wireless communication link with the companion user device to trigger the companion user device to establish a cellular communication link with the wireless carrier network 102.

At block 806, the primary user device may initiate a countdown of a predetermined period of time at the primary user device for the companion user device to receive an OTA update from the OTA platform via the cellular communication link. At decision block 808, if the countdown indicates that the predetermined time period has not elapsed ("no" at decision block 808), the process 800 may proceed to block 810. At block 810, the primary user device may determine whether a request to reestablish the short-range communication link is received from the companion user device. In various embodiments, the request may be initiated by the companion user device as a part of a short-range wireless connection procedure between the companion user device and the primary user device. At decision block 812, if the request to reestablish the short-range communication link is received ("yes" at decision block 812), the process 800 may proceed to block 814. At block 814, the primary user device may terminate the countdown for the elapsed period of time. At block 816, the primary user device may reestablish the short-range wireless communication link with the companion user device. In various embodiments, the establishment of the short-range wireless communication link may complete the short-range wireless connection procedure between the companion user device and the primary user device. Subsequently, the companion user device may terminate the cellular communication link with the wireless carrier network 102. Returning to decision block 812, if no request to reestablish the short-range communication link is received ("no" at decision block 812), the process 800 may loop back to decision block 808.

Returning to decision block 808, if the countdown indicates that the predetermined time period has elapsed ("yes" at decision block 808), the process 800 may proceed to block 818. At block 818, the primary user device may reestablish the short-range wireless communication link with the companion user device to trigger the companion user device to terminate the cellular communication link with the wireless carrier network 102.

In conventional implementations, the OTA platform typically retries an unsuccessful OTA update for a predetermined time period until the platform considers the OTA update to be a permanent failure. In such a scenario, a companion user device will be unable to receive an OTA update that has previously failed even if the companion user device subsequently disengages with a primary user device, powers up its cellular modem, and registers with the wireless carrier network. This may result not only in a decreased OTA success rate and the need for manual intervention by network engineers, but also delay of business and technical information to be received and acted upon by the companion user device. For example, a failure to update a PLMN list for an eSIM profile that is stored in an eUICC of the companion user device may result in the companion user device having difficulty registering with and using some wireless carrier networks. The ability of the OTA platform to force the companion user device to terminate its short-range wireless communication link with a primary user device and wirelessly attach to the wireless carrier network to receive an OTA update may prevent the occurrence of such technical difficulties and issues.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform actions comprising:
receiving a request from an entity to provide an over-the-air (OTA) update to a companion user device that is registered with a wireless carrier network;
identifying a primary user device associated with the companion user device based on subscriber account information for the companion user device;
sending a termination command to the primary user device to direct the primary user device to terminate an active short-range wireless communication link between the primary user device and the companion user device and trigger the companion user device to establish a cellular communication link with the wireless carrier network; and
sending an OTA update to the companion user device via the cellular communication link.

2. The one or more non-transitory computer-readable media of claim 1, wherein the actions further comprise, prior to identifying the primary user device, determining that an attempt to send the OTA update to the companion user device via the wireless carrier network had failed.

3. The one or more non-transitory computer-readable media of claim 1, wherein the actions further comprise notifying the entity that the OTA update to the companion user device is complete following the sending of the OTA update to the companion user device.

4. The one or more non-transitory computer-readable media of claim 1, wherein the entity is the wireless carrier network, a subscription management service, or a third-party partner of the wireless carrier network.

5. The one or more non-transitory computer-readable media of claim 1, wherein the sending the OTA update includes sending an update to an Embedded Subscriber Identity Module (eSIM) profile that is stored in an Embedded Universal Integrated Circuit Card (eUICC) of the companion user device.

6. The one or more non-transitory computer-readable media of claim 1, wherein the active short-range wireless communication link is a Bluetooth communication link or a Near Field Communication (NFC) communication link.

7. The one or more non-transitory computer-readable media of claim 1, wherein the primary user device is a smartphone, and the companion user device is a smartwatch.

8. The one or more non-transitory computer-readable media of claim 1, wherein the sending the termination command includes sending the termination command to the primary user device using a third-party messaging service.

9. The one or more non-transitory computer-readable media of claim 1, wherein the sending the termination command includes sending the termination command over an additional cellular communication link between the primary user device and the wireless carrier network.

10. The one or more non-transitory computer-readable media of claim 1, wherein the sending the OTA update includes sending the OTA update to the companion user device using a messaging service or a file transfer service over the cellular communication link between the companion user device and the wireless carrier network.

11. A computer-implemented method, comprising:
receiving a request from an entity to provide an over-the-air (OTA) update to a companion user device that is registered with a wireless carrier network;
identifying a primary user device associated with the companion user device based on subscriber account information for the companion user device;
sending a termination command to the primary user device to direct the primary user device to terminate an active short-range wireless communication link between the primary user device and the companion user device and trigger the companion user device to establish a cellular communication link with the wireless carrier network; and
sending an OTA update to the companion user device via the cellular communication link.

12. The computer-implemented method of claim 11, further comprising, prior to identifying the primary user device, determining that an attempt to send the OTA update to the companion user device via the wireless carrier network had failed.

13. The computer-implemented method of claim 11, wherein the active short-range wireless communication link is a Bluetooth communication link or a Near Field Communication (NFC) communication link.

* * * * *